June 2, 1942.  G. BINON  2,284,720

FOOD DISPENSING DEVICE

Filed Oct. 19, 1938

INVENTOR
Georges Binon
By
ATTORNEY

Patented June 2, 1942

2,284,720

UNITED STATES PATENT OFFICE 2,284,720

FOOD DISPENSING DEVICE

Georges Binon, New York, N. Y., assignor, by mesne assignments, to Frank E. Wolcott, West Hartford, Conn.

Application October 19, 1938, Serial No. 235,869

16 Claims. (Cl. 221—67)

My invention relates to food dispensing devices.

It has among its objects to provide an improved and simplified dispensing device, and, more particularly, one adapted to the dispensing of comestibles. Further objects of my invention are to provide an improved and simplified cover structure and an improved and simplified valve rod operating mechanism carried thereby. Other objects include the provision of such an improved device whereby it is made possible, while effecting the desired control of dispensing, substantially to reduce the cost of the device and to produce a construction which is not only markedly more convenient in use, but which has the operating mechanism so constructed and disposed as to enable the device to be definitely more attractive in appearance. These and other objects and advantages of my improved construction will, however, hereinafter more fully appear.

In the accompanying drawing, I have shown for purposes of illustration one embodiment which my invention may assume in practice.

Figure 1:
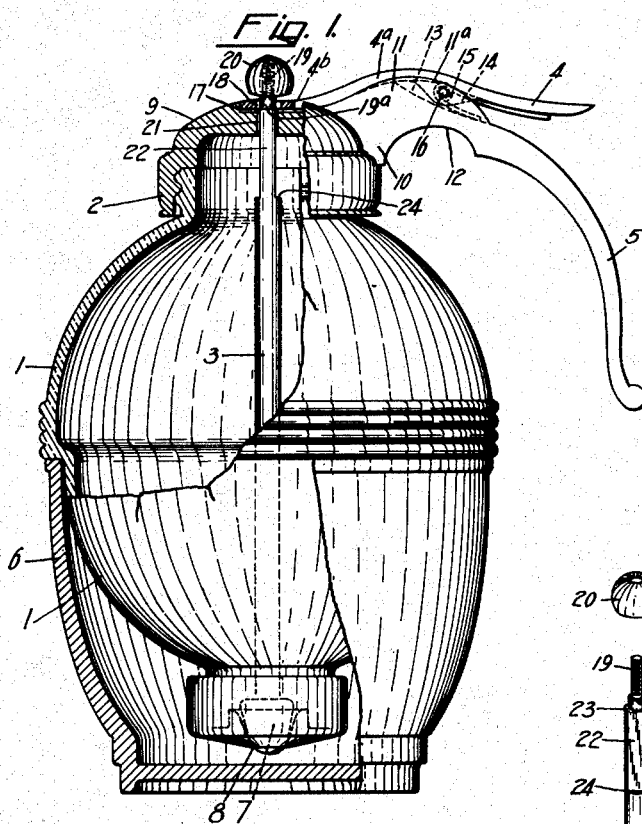
Figure 1 is a side elevation of my improvements embodied in a food dispenser, certain portions of the latter being broken away to facilitate illustration.
Figure 5:
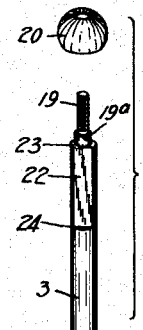
Fig. 5 is a detail perspective view showing the valve rod and its associated nut.
Figure 2:
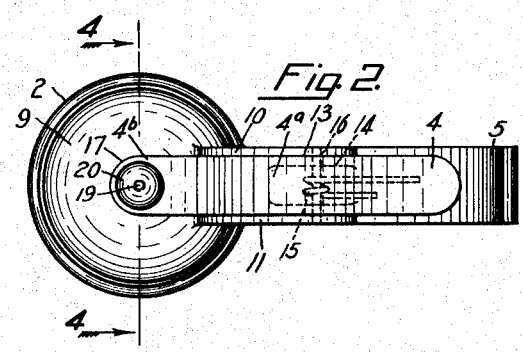
Fig. 2 is a top plan view of the cover member and the associated valve rod operating mechanism.
Figure 4:
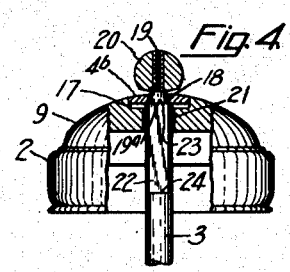
Fig. 4 is a detail sectional view on line 4—4 of Figure 2.
Figure 3:
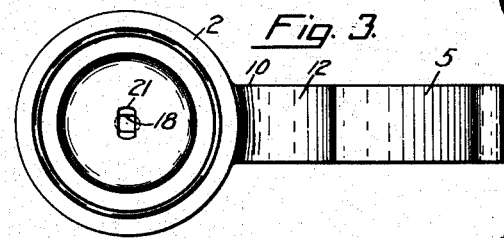
Fig. 3 is a bottom plan view of the structure shown in Figure 2.

In this illustrative construction, I have shown my improvements as applied to a dispenser of the well-known "Whitehall" type, including a dispensing bowl 1 having a removable cover 2, and a valve rod 3 operated by a lever 4 above a handle 5 on the cover, the bowl being seated in a receptacle 6 when not in use and the valve rod having a bottom valve 7 controlling the discharge through a bottom outlet 8 in the bowl; my present improvements being directed to the cover 2, the valve rod 3 and the operative connections for operating the latter, as hereinafter described.

In my improved construction, it will be observed that the cover 2, while having its lower edge threaded on the top of the bowl 1 as heretofore, is provided with a central raised portion or dome 9. To the side of this dome 9, a laterally projecting handle connection portion 10 is connected, herein formed integrally with the cover and of substantially the depth of the dome 9. This portion 10 also extends upwardly slightly above the dome 9 between the latter and the handle portion 5 in such manner as to produce a raised intermediate portion 11. As shown, a cut away portion 12 is also provided beneath this portion 11 and adapted to receive the forefinger of a hand gripping the handle 5. Further, it will be noted that the top of the raised portion 11 is curved as illustrated at 11a and also longitudinally grooved, as shown at 13, and that an intermediate portion 4a of the lever 4 herein conforms to the curve of the top of the portion 11 and has longitudinally extending spaced ears 14 extending into the groove 13. It will also be noted that a coiled spring 15 is disposed around a pivot pin 16 spanning the groove 13 and has its opposite ends engaging the bottom of the groove 13 at the outer end thereof and the under side of the lever 4, which herein overlies a portion of the handle 5 closely adjacent the latter and to the right of the cut away portion or notch 12. Attention is also directed to the fact that the inner end 4b of the lever 4 conforms to the top of the dome 9 and is disposed in a suitable groove 17 therein, both this portion 4b and the groove 17 projecting over the axis of the dome.

Improved operative connections are also herein provided between this end 4b of the operating lever 4 and the valve rod 3. As shown, the portion 4b is provided with an elongated hole or opening 18, while a threaded end 19 on the upper end of the rod is projected through this opening 18. Further, a connecting member or knob 20, herein in the form of a ball, is threaded on this threaded portion 19. As shown, this knob 20 engages the top of a suitable abutment, herein an unthreaded portion 19a on the rod 3 which also extends through the opening 18 and thus prevents the knob from clamping the lever end 4b to the rod 3. Moreover, it will be noted that the dome 9 is provided with a generally rectangular elongated slot 21 beneath and extending transversely of and wider than the opening 18, and that a portion 22 corresponding in shape to the slot 21 is provided on the rod 3 beneath the unthreaded portion 19a and extends up into the slot 21; sufficient clearance being provided between the portion 22 and the slot 21 to permit the rod to move up and down freely as the lever 4 moves about its pivot pin 16. Here attention is also directed to the fact that shoulders 23 are provided on the upper end of the portion 22 and that these are disposed above the bottom of the slot 17 in such manner as to space the portion 4b of the lever 4 above the bottom of the slot and thereby enable the spring 15 to depress the rod 3 and thereby press the valve 7 into closing position closing the outlet 8. Shoulders 24 are provided on the rod 3 at the bottom of the rectangular portion 22 thereof, in such manner as to provide abutments engageable with the top surface of the dome 9 to limit vertical movement of the rod 3.

In the use of my improved construction, it will be evident that the dispenser, including the bowl 1, may be readily lifted from the receptacle 6 when desired, the user grasping the handle portion 5. Further, with the forefinger in the cut away portion or notch 12, and the thumb comfortably disposed on the overlying end of the lever 4, it will be apparent that the valve 3 may be operated as desired to dispense from the bowl 1 through the bottom outlet 8. In operation, as the lever 4 moves about pin 16, it will be observed that the end portion 4b will move upward, and, through its engagement with the ball or knob 20, cause the rod 3 to move upward and thereby lift the valve 7 to open the bottom outlet 8; the play between the lever portion 4b and the rod portion 19a and between the rectangular portion 22 of the rod and the slot 21 in the dome, permitting the desired free raising and lowering movement of the valve. Further, it will be apparent that when the operator removes his thumb from the outer end of the lever 4, the spring 15 will return the parts to the valve closing position illustrated in Figure 1. Attention is also directed to the fact that when it is desired to refill the bowl 1, it is only necessary to unthread the knob or ball 20, in order to permit the cover 2 to be unscrewed from the top of the bowl and lifted off as desired, while leaving the valve 7 closing the outlet aperture 8. It will also be evident that the engagement of the receptacle portion 22 in the like slot 21 will act to prevent rotation of the valve rod 3 during removal or replacement of the knob 20. Further, when the cover is removed, it will be apparent that the spring 15 will act to hold the lever end 4b down over the aperture 21 in the dome 9, in such manner that the opening 18 in the portion 4b of the lever 4 will overlie the opening 21 and thereby permit the ready insertion of the upper end portions 19 and 22 of the rod 3 through the registering apertures 21 and 18 thus provided, it then being only necessary to thread on the cover 2 and to reconnect the knob or ball 20 to prepare the device again for service. On the other hand, when it is desired to cleanse the whole receptacle, it is only necessary to unscrew the cover 2 and lift out the whole valve rod which, by reason of its portion of rectangular cross section 22 received in the corresponding aperture 21 in the cover, will turn with the cover 2 as the latter is unscrewed, and, of course, be removable as a unit therewith without disconnecting the ball or knob 20. Obviously, when the valve rod is thus removed as a unit, the parts may similarly be returned to position as a unit on the bowl.

As a result of my improved construction, it will be apparent that my improved structure may be very inexpensively produced, the same, for example, being such as to make it possible to form the cover 2, handle 5, and operating lever 4 of Bakelite or other similar molded material. Further, it will be observed that the structure is such as to be very readily cleansed, all portions of the same being readily accessible for cleansing. Also, due to my improved arrangement of the parts, the handle may be firmly and comfortably grasped in the hand while the valve actuating lever is sensitively controlled with the thumb. At the same time, it will be observed that all of the operating mechanism is, in effect, disposed within the limits of the cover and handle portion, and in such manner as to make it possible to produce an exceedingly attractive appearance. These and other advantages of my improved construction will, however, be clearly apparent to those skilled in the art.

While I have in this application specifically described one embodiment which my invention may assume in practice, it will be understood that the same is shown for purposes of illustration, and that the same may be modified and embodied in various forms without departing from its spirit or the scope of the appended claims.

What I claim as new and desire to secure by Letters Patent is:

1. In a dispensing device, a receptacle having an open top and a bottom outlet, a cover closing said top, a valve closing said outlet and having an operating rod projecting through said cover, a valve rod operating lever carried by said cover, an abutment on the projecting end of said rod above said lever, and means for normally pressing down said rod including a spring normally maintaining said lever out of contact with said abutment.

2. In a dispensing device, a receptacle having an open top and a bottom outlet, a cover closing said top, a valve closing said outlet and having a rod projecting through said cover, a spring pressed valve rod operating lever carried by said cover, an abutment on the projecting end of said rod above said lever, and upper and lower abutments on said rod respectively spacing said first mentioned abutment above the working end of said lever and normally engaged by said lever.

3. In a dispensing device, a receptacle having an open top and a bottom outlet, a cover closing said top, a valve closing said outlet and having an operating rod projecting through said cover, a spring pressed rod operating lever carried by said cover normally pressing down said rod, and an abutment on the projecting end of said rod above said lever normally out of contact therewith, the working end of said lever and said cover having openings therein through which the portion of said rod below said abutment is extended and enabling free movement of the parts.

4. In a dispensing device, a receptacle having an open top and a bottom outlet, a cover closing said top, a valve closing said outlet and having a rod projecting through said cover, a removable element threaded on the projecting end of said rod, valve rod operating mechanism carried by said cover, and means for preventing joint rotation of said rod and removable element.

5. In a dispensing device, a receptacle having an open top and a bottom outlet, a cover closing said top, a valve closing said outlet and having a rod projecting through said cover, a removable element threaded on the projecting end of said rod, valve rod operating mechanism carried by said cover, and means for preventing joint rotation of said rod and removable element comprising interlocking surfaces on said cover and said rod.

6. In a dispensing device, a receptacle having an open top and a bottom outlet, a cover closing said top, a valve closing said outlet and having a rod projecting through said cover, a removable abutment on the projecting end of said rod, and valve rod operating mechanism carried by said cover including a spring pressed element engageable at will with said abutment and normally spaced below the latter and pressing said valve into closed position.

7. In a dispensing device, a receptacle having an open top and a bottom outlet, a cover closing said top, a valve closing said outlet and having an operating rod projecting through said cover, a removable abutment threaded on the projecting end of said rod, and valve rod operating mechanism carried by said cover having a spring pressed lever normally pressing down on said rod and engageable at will with said abutment beneath the latter to raise said rod.

8. In a dispensing device, a receptacle having an open top and a bottom outlet, a cover closing said top, a valve closing said outlet and having a rod projecting through said cover, a removable abutment threaded on the projecting end of said rod, and valve rod operating mechanism carried by said cover having a lever selectively engageable with said rod and abutment beneath the latter and an opening in said lever through which said rod projects, and said rod having abutment means beneath said opening normally engaged and pressed downward by said operating means.

9. In a dispensing device, a receptacle having an open top and a bottom outlet, a cover closing said top, a valve closing said outlet and having a rod projecting through said cover, a removable abutment threaded on the projecting end of said rod, and valve rod operating mechanism carried by said cover having a lever selectively engageable with said rod and abutment beneath the latter, an opening in said lever through which said rod projects, and means for interlocking said rod and cover against relative rotation.

10. In a dispensing device, a cover member connectible to a receptacle and having an axial aperture, a valve having an operating rod projecting through said aperture and interlocked against rotation with respect thereto, and valve rod operating mechanism carried by said cover including a spring pressed operating member operatively connected to the projecting end of said rod.

11. In a dispensing device, a cover member connectible to a receptacle and having an axial aperture, a valve having an operating rod projecting through said aperture and interlocked against rotation with respect thereto, and valve rod operating mechanism carried by said cover including a spring pressed operating member operatively connected to the projecting end of said rod, said rod having abutment means normally engaged by said spring pressed member and having removable abutment means threaded thereon and normally disposed in spaced relation to said member.

12. In a food dispenser, a cover member having a dome, a handle portion connected to and projecting laterally from said dome, a valve having a rod projecting through said dome and carrying an abutment on its projecting end, and spring pressed rod operating means carried by said handle portion and having an operating portion normally flush with the top of said cover and operatively connected to said rod beneath said abutment means.

13. In a food dispenser, a cover member having a dome, a handle portion connected to and projecting laterally from said dome, a valve having a rod projecting through said dome, and spring pressed rod operating means carried by said handle portion and operatively connected to said rod, said handle portion having a raised portion intermediate its ends and said dome having a recess in its top through which said rod projects and said operating mechanism having an operating lever substantially conforming to and overlying said raised portion and having an extremity disposable in said recess.

14. In a dispenser, a cover member having a top, an axial aperture through said top, and a laterally projecting handle portion, and a spring pressed operating lever pivoted on said handle portion and having an opening in its extremity normally pressed into contact with said top with said opening registering with said first mentioned aperture.

15. In a food dispenser, a cover member having a top, an axial aperture through said top, a slot in said top extending across said aperture, a valve operating rod extending through said aperture and having an abutment thereon normally disposed above the bottom of said slot and a removable abutment on the projecting upper end of said rod, and valve rod operating mechanism on said cover including a spring pressed lever having an operating portion in said slot normally engaging the first mentioned abutment on said rod and spaced below the second mentioned abutment thereon.

16. In a dispenser, a cover member having a top, an axial aperture through said top, a slot in said top extending across said aperture, and a laterally projecting handle portion, and a spring pressed operating lever pivoted on said handle portion and having its extremity normally pressed into contact with said top through said slot and an opening in said extremity normally registering with said first mentioned aperture.

GEORGES BINON.